US 7,087,685 B2

(12) United States Patent
Burns et al.

(10) Patent No.: US 7,087,685 B2
(45) Date of Patent: Aug. 8, 2006

(54) PROCESS AND SYSTEM FOR REMOVING HEAVIES FROM DILUENT RECYCLED TO A SLURRY POLYMERIZATION REACTOR

(75) Inventors: David H. Burns, Houston, TX (US); Donald W. Verser, Houston, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 10/947,935

(22) Filed: Sep. 23, 2004

(65) Prior Publication Data

US 2005/0038207 A1    Feb. 17, 2005

Related U.S. Application Data

(62) Division of application No. 10/662,249, filed on Sep. 15, 2003, now Pat. No. 6,818,186.

(60) Provisional application No. 60/411,254, filed on Sep. 16, 2002.

(51) Int. Cl.
   *C08F 2/12*    (2006.01)

(52) U.S. Cl. ............................ 526/70; 526/64; 526/67; 526/68; 528/501

(58) Field of Classification Search ............... 526/64, 526/67, 68, 70; 528/501
See application file for complete search history.

(56) References Cited

U.S. PATENT DOCUMENTS

| 5,455,314 A | 10/1995 | Burns | ........................ 526/61 |
| 5,565,174 A | 10/1996 | Burns | ........................ 422/131 |
| 6,045,661 A | 4/2000 | Verser | ........................ 203/73 |
| 6,559,247 B1 | 5/2003 | Kufeld et al. | ................. 526/64 |

*Primary Examiner*—Fred Teskin
(74) *Attorney, Agent, or Firm*—Fletcher Yoder

(57) ABSTRACT

A recycling and recovery system and process comprising a flash gas separator that receives a slurry comprising liquid medium and solid polymer particles. The flash gas separator separates the diluent from the solid polymer particles as a vapor stream comprising at least diluent and heavies. A line receives the vapor stream from the flash gas separator. The line leads to a heavies removal system that yields a liquid that is relatively concentrated in heavies and a diluent vapor that is relatively free of heavies. The liquid is passed to a heavies column while the diluent vapor is passed to a diluent recycle chamber and then recycled to a slurry polymerization reactor without additional treatment to remove heavies.

27 Claims, 3 Drawing Sheets

PROCESS AND SYSTEM FOR REMOVING HEAVIES FROM DILUENT RECYCLED TO A SLURRY POLYMERIZATION REACTOR

RELATED APPLICATIONS

This is a divisional of U.S. Non-Provisional application Ser. No. 10/662,249, filed on Sep. 15, 2003, now U.S. Pat. No. 6,818,186, and claims priority to U. S. Provisional Application 60/411,254, filed on Sep. 16, 2002. Both application Ser. No. 10/662,249 and application Ser. No. 60/411,254 are incorporated by reference herein.

FIELD OF INVENTION

The present invention generally relates to an olefin polymerization system and process. More particularly, the present invention relates to an olefin polymerization system and process that include an improved way of removing heavies from diluent and/or unreacted monomer withdrawn from and recycled to the polymerization reactor.

BACKGROUND OF THE INVENTION

Olefin polymerization processes may be conducted under slurry conditions. Such polymerization processes may be carried out in a loop reactor in which monomers are polymerized to form a slurry of solid polymer particles in a liquid medium. Portions of the slurry are withdrawn from the loop reactor through take-offs devices such as settling legs and continuous take-offs.

The slurry is then processed to separate the liquid medium (for example, a liquid diluent) from the solid polymer particles. Flashline heaters and flash chambers have been used to vaporize the liquid diluent through a combination of temperature and pressure adjustments, thereby separating the diluent from the solid polymer particles. Additionally, other types of equipment, such as purge columns, separating drums and cyclones, have been used for separation and other downstream treatment.

Efficient slurry polymerization processes typically recycle as much diluent as they reasonably can. That is, as the diluent is vaporized, diluent is processed for recycling back to the loop reactor. As the liquid diluent is vaporized at various stages of the polymerization process after the slurry is withdrawn from the loop reactor, various compounds and contaminants may also be vaporized along with the diluent.

"Heavies" are liquid components heavier than the diluent, and are often vaporized along with the diluent. During the recycling process, a vapor stream containing the diluent and heavies may be condensed and returned to the loop reactor as a recycle stream of the diluent and heavies. Heavies may concentrate or accumulate within the loop reactor and decrease reactor efficiency and/or cause damage within the loop reactor. For example, heavies buildup within the reactor may degrade product quality and/or distort reactor control making reactor problems and blockage more likely.

Another recycling technique separates a slip stream comprising diluent and minor amounts of monomer from the bulk of the flashed fluid components. The slip stream is subjected to olefin removal to give an essentially olefin-free stream for recycle to a catalyst preparation area. The slip stream may be taken off before and/or after a diluent recycle cooler. The slip stream(s) is then passed to a heavies removal column. The heavies removal column removes heavies from the slip stream, which can then be used to prepare a catalyst mud or slurry. The bulk of monomer-containing recycle diluent is passed to a diluent recycle surge (storage) vessel, and a recycle stream is passed back to the reactor. If desired, other purification steps such as water removal can be carried out on this recycle stream.

An efficient system and process of recycling diluent in a slurry polymerization process are desired. Further, an improved heavies removal system and process, which remove heavies from the diluent to be recycled to the reactor, are desired.

DETAILED DESCRIPTION OF THE INVENTION

Figure 1:
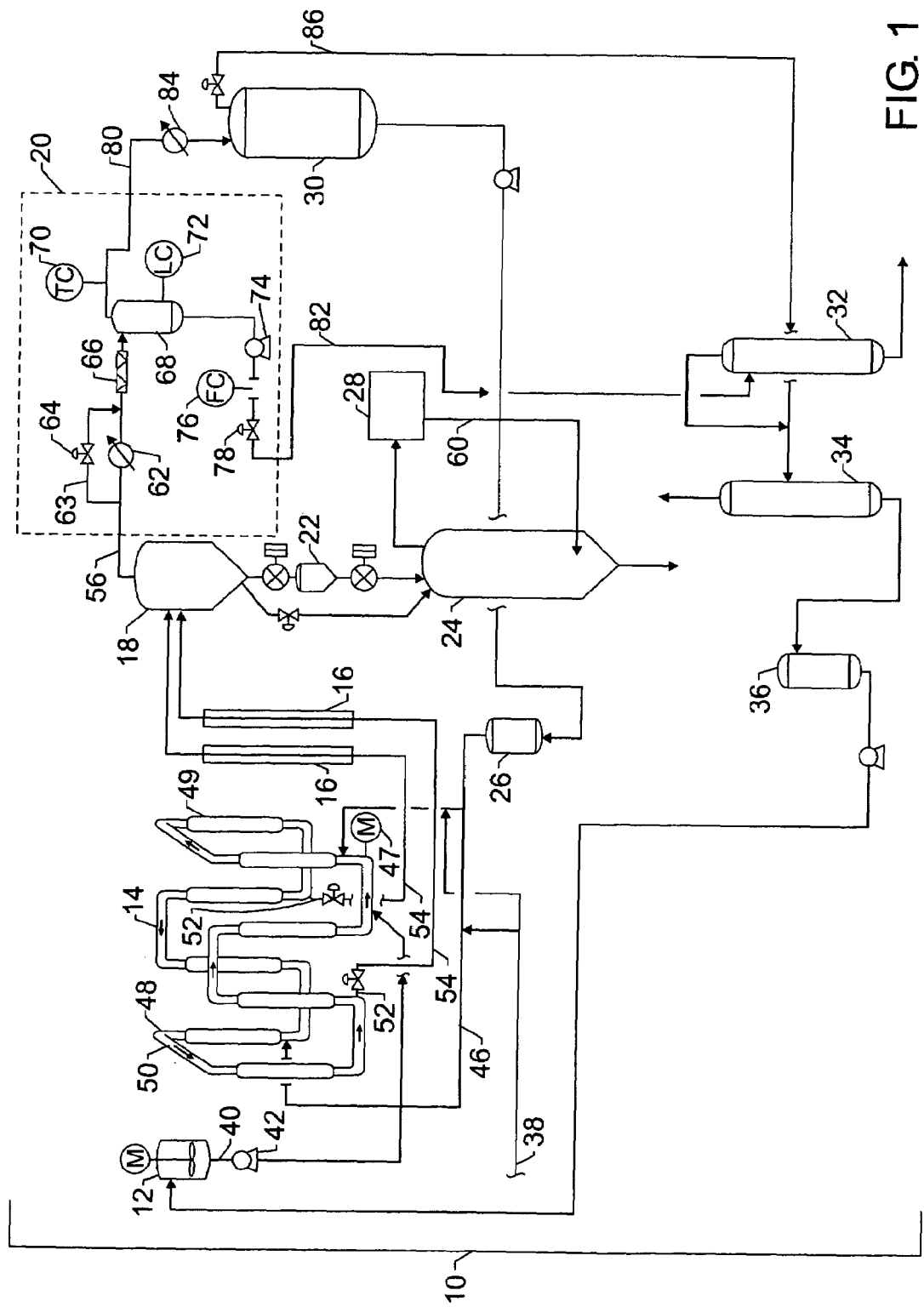
FIG. 1 is a representation of a slurry polymerization system which includes a novel heavies removal system.

The present invention provides a diluent recovery and purification system and process for a slurry polymerization reactor, especially for a loop polymerization reactor. The system and process comprise a flash chamber or flash gas separator, a vapor removal line, a condenser, and a liquid collection tank. The flash chamber or flash gas separator receives a slurry withdrawn from a loop reactor. Diluent, unreacted monomer, and various heavies are separated from the solid polymer particles as a first vapor stream. The vapor removal line receives the first vapor stream and transfers a first portion to a condenser that condenses at least some of the first portion to form a first liquid. It may be a relatively small amount portion, for example, about 2% of the first vapor stream that is condensed. The second portion of the first vapor stream bypasses the condenser but is thereafter combined and mixed with the first liquid to form a combined stream. The combined stream is sent to a liquid collection tank. As the vapor and liquid mix in the mixing device and/or in the line to the liquid collection tank, some of the liquid will be vaporized again, and the mixture may come to an equilibrium temperature. The combined stream will be cooled enough such that some liquid will be present. The liquid that collects in the liquid collection tank will have a higher concentration of the heavier compounds than the vapor leaving the collection tank. The liquid phase of an equilibrium mixture will be richer in the heavier components than the vapor phase because the heavier components are less volatile.

The liquid containing a higher concentration of the heavier components is passed from the liquid collection tank to a heavies delivery line, and the vapor is passed to a diluent recycle line. The vapor may be passed to a second condenser and a recycle surge tank. The vapor from the liquid collection tank can be condensed and recycled to the slurry polymerization reactor without further treatment to remove heavies.

During the separating step, vapor comprising diluent, unreacted monomers/comonomers and various inerts, both heavier and lighter than the primary diluent (for example, isobutane), are separated. Various other compounds associated with the feedstocks and diluent feed, such as other compounds with 4 carbons (for example, n-butane) and compounds with six carbons (for example, n-hexane), are inerts, which do not polymerize and function as a diluent along with isobutane. Heavies include additional compounds with six carbons along with any heavier compounds that may be produced in the reactor (such as oligomers). A portion of the vapor stream is then passed to a condenser in a heavies removal zone. The condenser may only condense a small portion of the stream or it may condense most or essentially all of the first portion. The liquid and vapor are then combined, which allows them to form a combined stream. The combined stream is passed to a liquid collection zone, and liquid and vapor are separated in the collection zone, after which the diluent vapor is passed to a diluent recycle line and the liquid is passed into a heavies delivery line.

The diluent vapor separated from the liquid (that is, diluent vapor exiting from a top portion of the liquid collection tank) is suitable for recycling to the polymerization reactor. The diluent vapor is passed from the diluent recycle line to a diluent recycle tank. The diluent vapor is condensed by heat exchange. The diluent can then be recycled to the polymerization zone without having to remove additional heavies. Further, the liquid is passed from the heavies delivery line to a heavies column.

The present invention is applicable to any olefin polymerization in a loop reactor untilizing a liquid medium so as to produce a fluid slurry of polymer solids in the liquid medium. Suitable olefin monomers include 1-olefins having up to 8 carbon atoms per molecule and no branching nearer the double bond than the 4-position. The present invention is particularly suitable for the homopolymerization of ethylene and copolymerization of ethylene and a higher 1-olefin such as butene, 1-pentene, 1-hexene, 1-octene or 1-decene.

Suitable diluents for use as the liquid medium are well known in the art and include hydrocarbons, which are inert and liquid under reaction conditions. Suitable hydrocarbons include isobutane, propane, n-pentane, i-pentane, neopentane and n-hexane, with isobutane being especially preferred. Additional details regarding loop reactor apparatus and polymerization processes may be found in U.S. Pat. Nos. 4,674,290; 5,183,866; 5,455,314; 5,565,174; 5,624,877; 6,005,061; 6,045,661; 6,051,631; 6,114,501; 6,262,191; and 6,420,497, which are incorporated by reference herein.

Additionally, the present techniques for controlling heavies may be employed where the monomer is the liquid medium for the polymerization. For example, the present techniques may be used for the polymerization of propylene where propylene is the liquid medium and an inert diluent is not present in any substantial amount. A diluent may still be used for the catalyst. For illustration, but not as a limitation, the present invention will be described in connection with a polyethylene process using an inert diluent as the liquid medium, but it is to be understood that the present invention may also be employed where the monomer is used as the liquid medium and would take the place of the diluent in the following descriptions.

FIG. 1 is a representation of a slurry polymerization system 10 according to the present invention. The slurry polymerization system 10 includes a catalyst feed tank 12 (such as a catalyst mudpot or an agitated tank) containing a mixture of catalyst and diluent. Catalyst and diluent from the catalyst tank 12 are pumped into a loop reactor 14. FIG. 1 also shows flashline heaters 16, a flash gas separator (also described as an intermediate pressure flash chamber) 18, a heavies removal system 20, a fluff chamber 22, a purge column 24, a recycle treater 26, an isobutane/nitrogen recovery unit (INRU) 28, a recycle tank 30, a heavies column 32, a lights column 34, an olefin free surge unit 36, and a series of conduits, pumps and condensers. For the sake of simplicity, some components unrelated to the claimed systems and processes and/or that are related to production or routine details, such as intervening valves and connecting lines/conduits of the slurry polymerization system 10, are not shown.

Catalyst or catalyst and diluent from the catalyst feed tank 12 passes through conduit 40 and is pumped into the loop reactor 14 by pump 42. Suitable catalysts are well known in the art. For example, chromium oxide on a support such as silica may be used, as disclosed in U.S. Pat. No. 2,825,721, issued to Hogan and Banks, which is herein incorporated by reference in its entirety. Additionally, other catalysts well known in the art (for example, Ziegler catalysts, metallocene catalysts) may also be used for olefin polymerization.

The slurry polymerization system 10 also includes a monomer feed 38. A monomer such as ethylene, for example, is introduced into the loop reactor 14. Additional conduits and lines may supply monomer and/or diluent into the loop reactor 14 or join in a line 46 for introducing a combined stream of fresh ethylene and diluent recycle as shown. Monomer, diluent, catalyst and any other feed materials may be introduced into the loop reactor 14 at one or several points.

As shown in FIG. 1, the loop reactor 14 may comprise a plurality of vertical members 48 formed integrally with horizontal members 50 (or curved connecting members). In order to maximize heat transfer within the reactor 14, the distance between vertical members 48 is preferably minimized. Thus, the horizontal members 50 may be of minimal length. Alternatively, the horizontal members 50 may be eliminated such that the vertical members 48 are connected through curved connecting members. Alternatively, the loop reactor may be substantially horizontal and not have any vertical members. The longer members 48 preferably have heat exchange jackets 49. The vertical members 48 and horizontal members 50 (or curved connecting members) define a loop reaction zone. The loop reaction zone may include more or fewer vertical members 48 and corresponding horizontal members 50 as that shown in FIG. 1. Further, the loop reactor may be oriented vertically or horizontally (for example, by rotating reactor 14 in FIG. 1 by 90 degrees) or may be entirely horizontal, with no vertical members. The connecting members 50 may be any shape or form that connects the vertical segments 48 and allows fluid to flow therebetween.

An impeller is located in the loop reactor 14 to circulate the slurry. The impeller is driven by a motor 47. The impeller is located in the interior of the loop reaction zone defined by the vertical members 48 and the horizontal members 50. The impeller 47 is operable to circulate fluid slurry, comprising liquid diluent and solid olefin polymer particles, through the loop reactor 14.

An intermediate product slurry, comprising the liquid medium and solid polymer particles, is withdrawn, or taken off, from the loop reactor 14 by way of the continuous take-off devices 52. A continuous take-off device 52 is disclosed in U.S. Pat. No. 6,239,235, which is incorporated by reference herein. The slurry polymerization system 10 may include more or fewer than the continuous take-off devices 52 (and corresponding conduits and flashline heaters 16) shown in FIG. 1. For example, one, two, three or more continuous take-off devices 52 may be used. Further, the continuous take-off devices 52 may be tangentially positioned on curved members. The continuous take-off devices 52 may be positioned anywhere on the loop reactor 14.

Alternatively, settling legs may be used in conjunction with, or instead of, the continuous take-off devices 52.

As fluid slurry is withdrawn from the loop reactor 14 as intermediate product slurry, the intermediate product slurry is passed from the continuous take off-device 52 to a flashline 54, which forms a first fluid passage for the withdrawn portion of the slurry to downstream processing apparatus. The flashline 54 may be provided with a flashline heater 16 surrounding at least a portion of the flashline 54. The flashline heater 16 contains a heated fluid (for example, steam) that provides indirect heating to the contents of the flashline 54, such that intermediate product slurry that passes through the flashline 54 is heated. Preferably, the intermediate product slurry is heated such that at least a majority of the liquid diluent is vaporized, thereby yielding diluent vapor and a post-flashline slurry. The post-flashline slurry comprises the solid polymer particles and a reduced amount of liquid diluent (as compared to the intermediate product slurry). Alternatively, the post-flashline slurry may be heated such that less than a majority of the liquid diluent is vaporized. Preferably, the intermediate product slurry is heated in the flashline 54 such that, as it enters the flash gas separator 18, essentially all of the liquid diluent has been vaporized ("flashed") within the flashline 54. The "flashing" tends to occur as the intermediate product slurry passes across the continuous take-off device 52 and the flashline 54. Preferably, the intermediate product slurry is heated in the flashline 54 to fully vaporize the diluent liquids so that the solids and vapors that discharge into the flash gas separator 18 are free of liquids.

In some systems utilizing a flashline heater 16, some or all of the diluent (or other liquid medium) will flash in flashline 54 prior to introduction to the flash gas separator 18, which may be termed a "flash chamber" or an "intermediate pressure flash chamber." These terms still are frequently used for the tank that follows the flashline, where vaporized diluent separates from polymer solids. "Flash tank" or "flash chamber" are still used even though there may be little or no flashing in the flash tank if all or substantially all of the diluent is vaporized in the flashline. In current designs that have the flashlines discharging at higher pressures and without downstream drying devices, it is intended to design the flashlines so there is little or no pressure drop on entering the flash tank, with essentially all of the liquids vaporized prior to entering the vessel.

After the intermediate product slurry passes through the flashline 54, the resulting post-flashline fluff and vaporized diluent is passed into the flash gas separator tank or chamber 18. The flash gas separator 18 preferably is at an intermediate pressure, lower than the pressure in the reactor but higher than the pressure of downstream apparatus. Preferably the flash gas separator 18 is at a pressure whereby the separated flash gas (or a majority or other large portion) may be condensed by heat exchange without compression. In the flash gas separator 18, most of the diluent, unreacted monomer, and heavies form a vapor stream (flash gas) that rises toward a top portion of the flash gas separator 18, while "fluff" falls to a bottom portion of the flash gas separator 18. The fluff comprises solid polymer, which may have trace or other small amounts of diluent entrained therein.

The fluff may pass to a second flash gas separator (for example, a low pressure flash chamber). A two-stage flash system is disclosed in U.S. Pat. No. 4,424,341, which is incorporated by reference herein. Alternatively, the fluff may pass from a bottom portion of the first flash chamber to the purge column 24. (The purge column 24 may follow the second flash chamber instead). Alternatively, the fluff may be passed through a conveyor dryer and then to a purge column as described in U.S. Pat. No. 4,501,885, which is incorporated by reference herein. Entrained diluent within the polymer particles is separated from the fluff in the purge column 24 by passing nitrogen gas through the solid polymer particles (the fluff). The nitrogen extracts entrained diluent and/or liquid diluent, thereby leaving solid polymer essentially free of entrained diluent. The solid polymer is then deposited, collected, ejected or otherwise withdrawn from a bottom portion of the purge column 24.

The nitrogen and extracted diluent are then passed out a top portion of the purge column 24 to an isobutane/nitrogen recovery unit (INRU) 28. The INRU processes the vapors removed from the fluff in the purge column. The INRU separates the nitrogen from the diluent vapors by condensing the diluent vapors into liquids. In one sense the INRU functions somewhat like the heavies removal system by condensing a relatively small amount of the flash gas and sending a liquid to the heavies column. The INRU 28 separates nitrogen from diluent and other hydrocarbons. The nitrogen is then passed back to the purge column 24 through a nitrogen return line 60. The separated diluent and other hydrocarbons may be returned to the recycle tank 30 and ultimately returned to the loop reactor 14. Alternatively, some or all of the liquids from the INRU 28 may be sent to the heavies column 32. The INRU is designed to produce a liquid product which contains substantially all the hydrocarbons (but not the solid polymer particles) removed in the purge column.

The vapor stream which has been vaporized either in the flashline 54 and/or in the flash gas separator 18, which is also referred to herein as the first vapor stream, is passed to the heavies removal system 20 by way of vapor removal line 56. The vapor removal line 56 may include a series of filters and components, such as bag filters, for filtering fine polymer particles from the vapor stream in order to prevent the fines from entering the heavies removal system 20. For example, for a suitable polyethylene process, the vapor stream is primarily isobutane diluent, but the vapor stream diluent also contains heavies, such as 1-hexene co-monomers and other hydrocarbons having six or more carbon atoms. The vapor stream may also contain lighter hydrocarbons such as ethane and ethylene.

Figure 2:
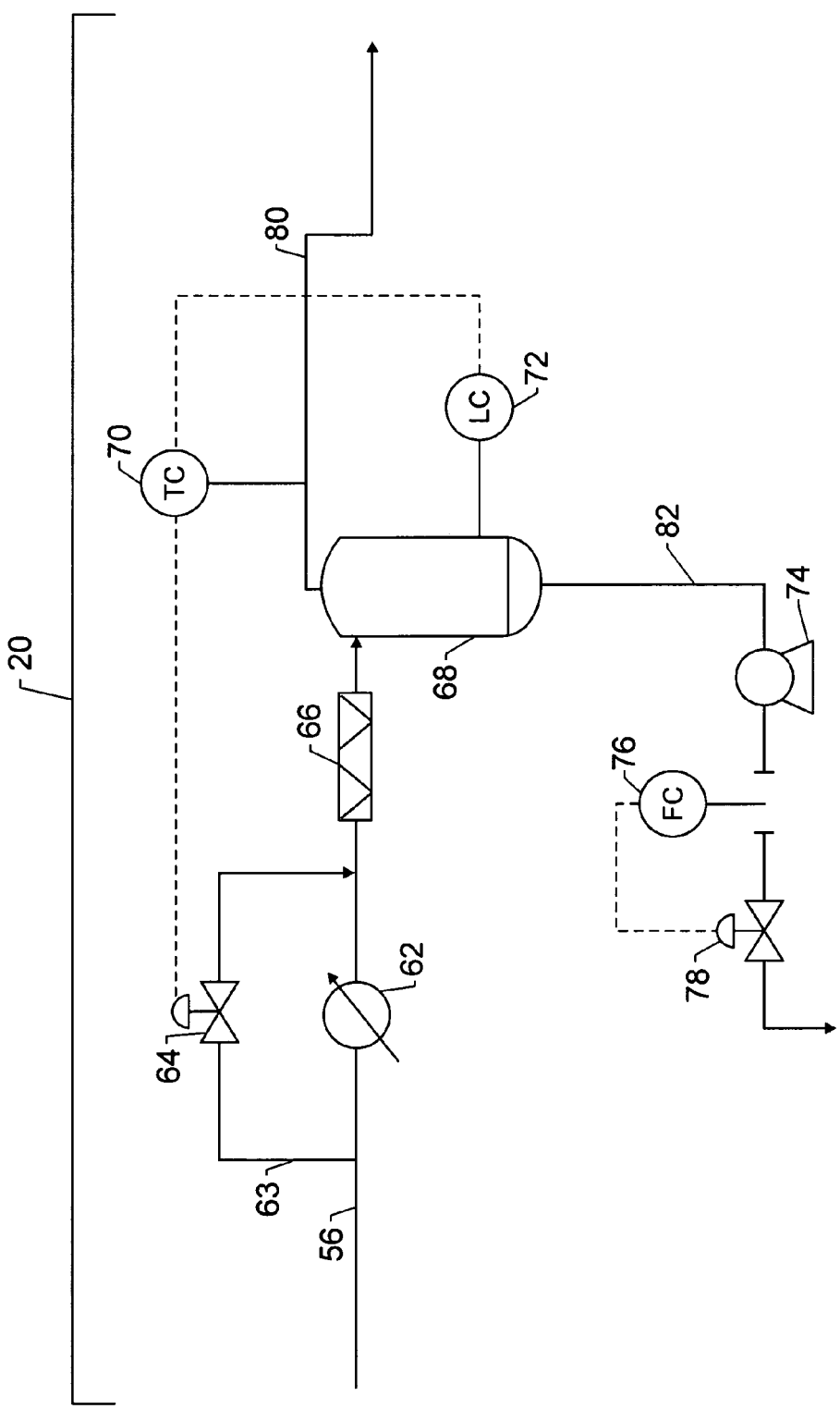
FIG. 2 is a representation of the heavies condenser, static mixer, and liquid collection tank from the system of FIG. 1, as well as a novel control scheme.

FIG. 2 is a representation of an exemplary heavies removal system 20. The heavies removal system 20 is fluidly connected to, and communicates with, a top portion of the flash gas separator 18 through the vapor removal line 56. In the equipment shown in FIG. 2, the heavies removal system 20 includes a first condenser 62, a bypass line 63, a bypass valve 64, a static mixer 66, a liquid collection tank 68, a temperature controller 70, a level controller 72, a pump 74, a flow controller 76 and a flow control valve 78.

The heavies removal system 20 is designed and/or set so as to condense a small amount of liquid from the first vapor stream. A fraction of flash gas (in other words, a first portion of the first vapor stream) is passed through the condenser 62, which condenses some of that fraction into a liquid. When the liquid from condenser 62 contacts the relatively hot flash gas that has bypassed the condenser 62 (in other words, a second portion of the first vapor stream), some of the liquid again vaporizes, leaving a residual amount of liquid and a larger amount of flash gas. The liquid and flash gas are passed to the liquid collection tank 68. A static mixer 66 can be used to assure proper contact, rapid revaporization and equilibrium conditions in the liquid collection tank 68. The rate of flow may be set on flow controller 76. The level in the liquid collection tank 68 is determined by the amount of liquid generated by the condenser 62. If the liquid level in the collection tank 68 rises, the temperature controller 70 adjusts to a higher temperature to decrease the amount of liquids generated by the condenser 62. Conversely, if the level within the liquid collection tank 68 decreases, the level controller 72 acts to decrease the temperature set point on the temperature controller 70, thereby directing more flow through the condenser 62 to generate more liquids. Consequently, the level controller adjusts the temperature controller to generate an amount of liquids that matches the desired amount of liquids as set by the flow controller. This provides an efficient and relatively easy way to control the amount of liquid condensed from the first vapor stream.

As seen in FIG. 1, the condenser 62 of the heavies removal system 20 is in addition to flash gas condenser 84. The heavies removal system 20 will generally be used to condense a relatively small amount of the total vapor from vapor removal line (in other words, of the first vapor stream). For example, the heavies removal system 20 may condense (in other words, form a liquid from) as little as about 1% or less of the total vapor stream from the first flash chamber. One may desire to set a maximum for the amount of the first vapor stream condensed by the first condenser. For example, the heavies removal system 20 may be set to condense at most about 10%, alternatively at most about 5%, alternatively at most about 4%, alternatively at most about 3% of the first vapor stream. Condenser 62 may condense from about 0.1 to about 15% of the flash gas. The amount of liquid condensed by condenser 62 may be up to 5 times greater than the liquid generated by the heavies removal system 20.

The heavies removal system 20 produces liquid with a higher percentage of the heavier components than is found in the vapor stream. For example, the liquid in the collection tank 68 may contain at least about 1%, alternatively at least about 5%, alternatively at least about 10%, of the heavies in the vapor stream. In particular, the heavies removal system is expected to be particularly effective in removing most oligomers, for example, at least about 2%, alternatively at least about 10%, alternatively about 20% of the oligomers in the vapor stream. Even if the heavies removal system does not remove all the heavies from the liquid medium to be recycled to the polymerization reactor, it still provides an important benefit by preventing an excessive buildup of heavies in the recycled medium.

The liquid concentrated in heavies may be referred to as a heavies liquid. The heavies liquid is routed to a heavies column where the heavier components can be removed from the process. Thus the concentration of heavier components in the flash gas is decreased from levels that would otherwise exist.

The present process and system result in the generation of a recycle diluent stream having fewer heavies than would otherwise build up in the recycle diluent stream. This system can work in conjunction with a direct recycle process, allowing most of the diluent to be condensed and recycled directly back to the reactor without passing through fractionation columns that remove heavier and lighter components. In the direct recycle process it is desirable that only a fraction of the total recycle diluent is sent to fractionation where heavier components can be rejected and lights can be removed and olefin-free diluent generated. With only a fraction of the recycle diluent feeding fractionation, the fractionation columns can be relatively small.

As shown in FIG. 2, the condenser 62 is in fluid connection with the vapor removal line 56 and is upstream from the static mixer 66. The bypass valve 64 is interposed within the bypass line 63 such that the bypass valve 64 may selectively open and close the bypass line 63, thereby controlling the flow of vapor through the bypass line 63. The liquid collection tank 68 is downstream from the static mixer 66. A diluent recycle line 80 is in fluid communication with the liquid collection tank 68 and connects the liquid collection tank 68 to a recycle tank 30. The bypass valve 64 may be in informational communication with the temperature controller 70, which is interposed within the diluent recycle line 70. Additionally, or alternatively, the bypass valve may be in informational communication with the level controller 72, which is positioned within the liquid collection tank 68. The temperature controller 70 and the level controller 72 may be assisted by or used in conjunction with a central processing unit or other logic unit or main controller. The temperature controller 70 and the level controller 72 relay signals to the bypass valve 64 to close or open the bypass line 63, depending on temperature and level conditions within the heavies removal system 20. This control scheme permits automatic control to obtain the desired amount of liquid in the liquid collection tank 68.

The bottom portion of the liquid collection tank 68 is in fluid communication with a heavies delivery line 82, which receives a liquid concentrated in heavies from the liquid collection tank 68. A pump 74 may be positioned in the heavies delivery line 82, which provides sufficient force to move the liquid concentrated in heavies through the heavies delivery line 82 to the heavies column 32. A flow controller 76, which may be assisted by or used in conjunction with a central processing unit or logic unit or a main controller, is positioned downstream from the pump 74 and is in informational communication with the flow control valve 78, which may selectively open and close the heavies delivery line 82. The flow control valve 78 may be operated in conjunction with the flow controller 76. Depending on the rate of flow of heavies through the heavies delivery line 82, the flow controller 76 may send a command signal to the flow control valve 78 to open or close the heavies delivery line 82.

The heavies removal system 20 is used to produce a liquids stream relatively rich in heavier components. Once the heavies or a portion of heavies are removed, the diluent may be recycled and returned to the loop reactor 14. The heavies removal system 20 does not necessarily remove all heavies. Rather, the heavies removal system 20 may only remove a small portion of the heavies in order to limit potential build-up of heavies to relatively low levels. In particular, the heavies removal system can limit the build-up of oligomers.

The heavies removal system 20 is configured to produce liquids relatively concentrated in heavies that were contained within the first vapor stream. It is contemplated that at least some of the heavies from the first vapor stream, or a major portion thereof, will be passed to the heavies delivery line 82. For example, about 98% of the first vapor stream may remain as a vapor as a result of bypassing the first condenser, in other words only a small amount of liquids are generated. A portion of the first vapor stream is sent to the condenser where all or most of that portion is converted to liquid. This colder liquid is combined with the hotter gases that bypassed the condenser and this liquid and vapor mixture is sent to the static mixer 66. The static mixer ensures good mixing of the liquids and vapors so that substantially equilibrium conditions can quickly be generated.

Substantially equilibrium conditions means that the liquid and vapor in the liquid collection tank come to substantially the same temperature with some of the liquids vaporizing to accomplish this. The gas may then be passed to collection tank where the liquids and vapors initially intermingle but also are separated. As flash gas condenses and re-evaporates, heavies are left behind in the liquid at the bottom of the collection tank.

The amount of the first vapor stream that is diverted into the condenser 62 is controlled to generate a desired amount of liquids in the liquid collection tank 68. The bypassed hot vapor and condenser-cooled liquid from the condenser 62 are then mixed by the static mixer 66. The temperature controller 70 may signal the bypass valve 64 to open or close to a desired extent, depending on the temperature of the diluent vapor in the diluent recycle line 80.

After the flash gas vapor and condensed liquid are mixed together to form a mixture, the mixture is passed into the liquid collection tank 68. The liquid collection tank 68 separates the liquids containing a higher concentration of the heavier components from the diluent vapor. It is desirable to reduce or avoid pressure or temperature gradients in the liquid collection tank.

The temperature controller 70 can be periodically or occasionally reset by the level controller on the collection tank. If the level in the collection tank drops below the level setpoint, the controller sends a signal to lower the setpoint of the temperature controller which in turn sends a signal to close the bypass valve to a desired extent and force more flow through the condenser to generate more liquids. Conversely, if the level in the tank is above the desired setpoint, the level controller sends a signal to raise the setpoint of the temperature controller which in turns sends a signal to open the bypass valves to a desired extent which decreases the flow through the condenser which reduces the amount of liquids formed. When the setpoint of the flow controller is changed, the flow control valve opens or closes to produce the desired flow, and this change of flow is reflected as a change in level in the tank, and the level controller reacts to change the amount of liquids condensed.

The liquid concentrated in heavies is passed from the liquid collection tank 68 through the heavies delivery line 82 and pumped towards the heavies column 32 by the pump 74. The flow controller 76 monitors and controls the flow of the liquid through the heavies delivery line 82 by signaling the flow control valve 78 to open or close the flow control valve 78, depending on the desired amount of liquids to be generated. For example, if the operators want to create 1500 kg/hr liquids, it is desirable that that number can be entered as a setpoint to the flow controller. The liquids are ultimately delivered to the heavies column 32.

Referring again to FIG. 1, the heavies column 32 separates the liquid medium and lighter components from the heavies. The diluent (in other words, the liquid medium) extracted in the heavies column 32 is then passed to a lights column 34, where lights are removed, thereby yielding essentially or substantially pure diluent, which is then passed through the olefin-free surge 36 and pumped to the catalyst feed tank 12 or to the recycle tank 30, and it is then pumped to the loop reactor 14.

Figure 3:
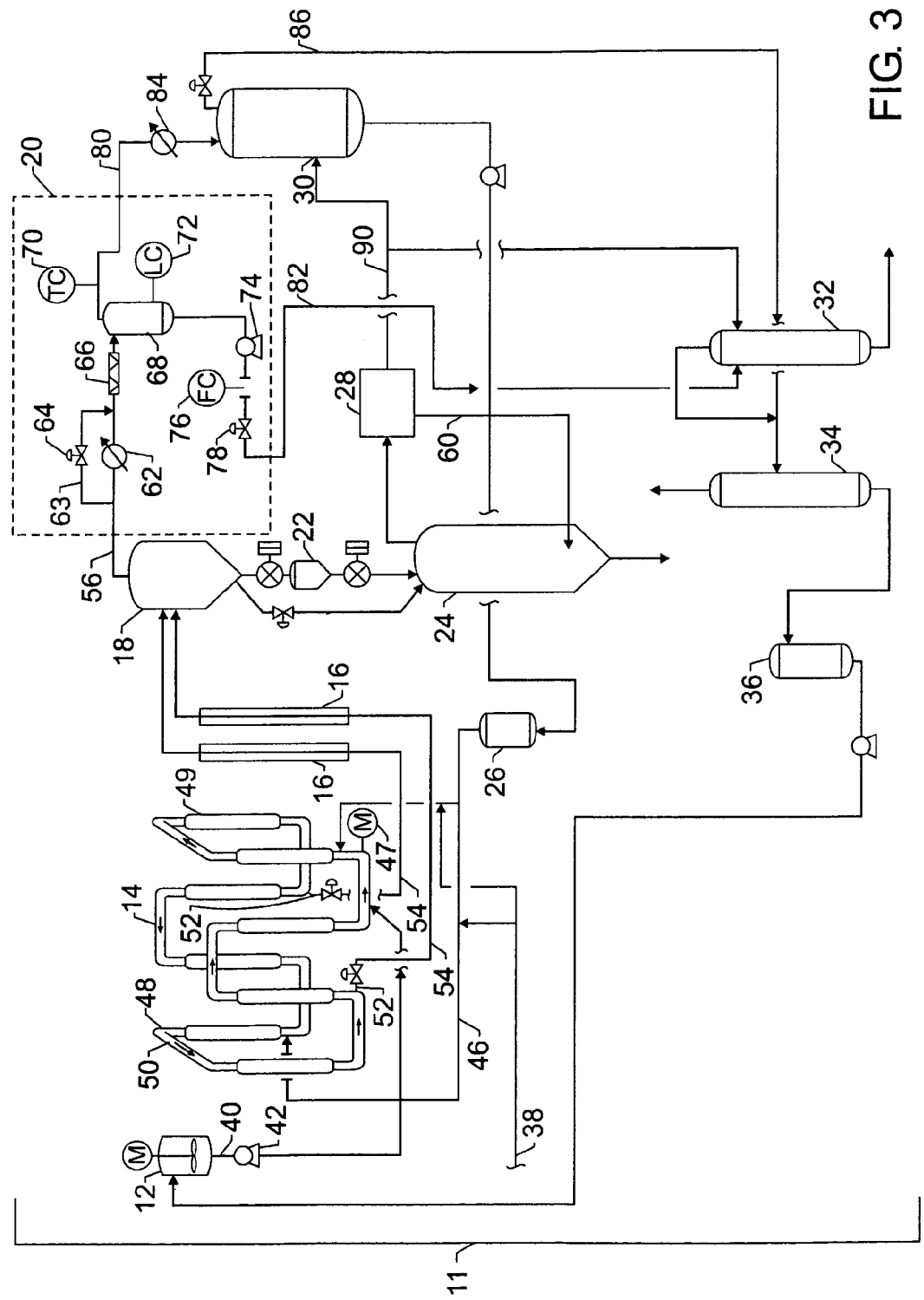
FIG. 3 is another representation of a slurry polymerization system which includes a novel heavies removal system.

The diluent vapor within the diluent recycle line 80 is passed through a flash gas condenser 84, which may condense, or liquefy, the diluent. Some diluent with a relatively high concentration of lighter components may remain as vapor. The stream is passed to the recycle tank 30, which serves as a vapor-liquid separation drum and the liquids are passed directly back to the loop reactor 14 through the recycle treater 26. The vapor which has a higher relative concentration of the lighter components is passed to fractionation where the light components are rejected, and 1-hexene and hexanes are recovered or rejected, octane and heavier compounds are rejected, and diluent (usually isobutane) is recovered free of olefins FIG. 3 is a schematic representation of another slurry polymerization system 11, which includes a novel heavies removal system. As shown in FIG. 3, the lights removal line 86 may be a vapor line that enters through the side of the heavies column 32. Since vapor line 86 will contain small amounts of hexane, it is desirable to have it enter the heavies column because all hexanes must be excluded from the lights column. Also, there is a liquid product line 90 extending from the INRU 28. The INRU is designed to recover both nitrogen and hydrocarbons (diluent) as liquid. The liquid product line 90 may be split with one branch connecting to the heavies column 32 and another branch connecting to the recycle tank 30. In this way, liquids may be directed to the heavies column 32 and/or to the recycle tank 30. Also, the olefin-free product that is passed from the olefin-free surge unit 36 may be pumped back to the recycle tank 30 in addition to the catalyst mix tank 12.

Thus, the present invention provides a more efficient system and process of recycling the liquid medium in a slurry polymerization process. The present invention provides an improved heavies removal system and process, which removes a greater amount of heavies, as compared to prior systems, from the liquid medium that is to be recycled to the reactor. A direct recycle system is provided where most or all of the liquid in the reactor effluent (diluent and other hydrocarbons) is separated from the fluff, condensed and recycled back to the reactor without passing through purification (fractionation) steps. Other systems pass substantially all of the diluent vapor (reactor effluent) through fractionation (purification steps) where all of the heavier compounds can be separated. In a direct recycle system there is a desire to reject heavier components as well as lighter components so they do not concentrate in the process and harm the reactor or product. So in the direct recycle process some recycle diluent (in other words, reactor effluent hydrocarbons) are still processed in a small purification (fractionation) section to generate some pure (olefin-free) diluent for use as catalyst diluent, and to reject some heavy and light components to prevent abnormal build up or concentration. By fractionating only a small portion of the diluent recycle, the fractionators can be smaller. The direct recycle fractionators can be fed from a recycle liquid slip stream or by INRU liquid product but by creating liquids with the present heavies removal system, heavies concentration is controlled better, in other words for the same fractionation feed rate, heavies concentration in the recycle is lower.

The present system and process described may also feed fractionation (heavies and lights columns) when the INRU is not operational so that olefin-free diluent may be generated to slurry the catalyst.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

That which is claimed is:

1. A process for recycling a liquid to a polymerization reactor, the method comprising:
    vaporizing a portion of a slurry withdrawn from a polymerization reactor to form a first vapor stream, wherein the slurry comprises solid polymer particles in a liquid medium, and the liquid medium comprises a primary component and heavies which are components less volatile than the primary component;
    separating the first vapor stream from the slurry;
    condensing a first portion of the first vapor stream in a first condensing zone to form a first liquid, and passing the first liquid to a liquid collection zone;
    passing a second portion of the first vapor stream to the liquid collection zone without passing the second portion through the first condensing zone;
    separating contents of the liquid collection zone into a second vapor stream and a second liquid;
    passing the second liquid to a heavies purification zone;
    condensing the second vapor stream in a second condensing zone to form a third liquid; and
    recycling the third liquid to the polymerization reactor without fractionating the third liquid to remove heavies from the third liquid.

2. The recycling process of claim 1, comprising mixing together the first liquid and the second portion of the first vapor stream before passing the first liquid and the second portion of the first vapor stream to the liquid collection zone.

3. The recycling process of claim 1, wherein the primary component in the liquid medium comprises diluent or propylene, or a combination thereof.

4. The recycling process of claim 1, wherein separating the first vapor stream from the slurry yields the solid polymer particles having an entrained residual amount of the liquid medium.

5. The recycling process of claim 4, wherein recycling comprises passing the solid polymer particles to a purge zone to substantially extract the entrained residual amount of liquid medium from the solid polymer particles.

6. The recycling process of claim 1, wherein at least about 1% of the heavies in the first vapor stream are condensed into the second liquid.

7. The recycling process of claim 1, wherein at least about 5% of the heavies in the first vapor stream are condensed into the second liquid.

8. The recycling process of claim 1, wherein at least about 10% of the heavies in the first vapor stream are condensed into the second liquid.

9. The recycling process of claim 1, wherein at least about 2% of oligomers in the first vapor stream are condensed into the second liquid.

10. The recycling process of claim 1, wherein at least about 10% of oligomers in the first vapor stream are condensed into the second liquid.

11. The recycling process of claim 1, wherein at least about 20% of oligomers in the first vapor stream are condensed into the second liquid.

12. The recycling process of claim 1, comprising:
    measuring a level of liquid in the liquid collection zone; and
    adjusting an amount of the first portion of the first vapor stream sent to the first condensing zone based on the level of liquid in the liquid collection zone.

13. A process for operating a slurry polymerization system, the process comprising:
    withdrawing a slurry comprising solid polyolefin particles and a liquid from a polymerization reaction zone, wherein the liquid comprises heavies;
    vaporizing at least a portion of the liquid to form a first vapor stream;
    separating the first vapor stream from the solid polyolefin particles;
    passing a first portion of the first vapor stream to a first condensation zone;
    condensing the first portion of the first vapor stream to form a first liquid stream;
    passing a second portion of the vapor stream to a collection zone without passing the second portion of the vapor stream through the first condensation zone;
    collecting the first liquid stream and the second portion of the first vapor stream in the collection zone;
    separating contents of the collection zone into a second vapor stream and a second liquid stream;
    passing the second liquid stream to heavies removal treatment;
    passing the second vapor stream to a second condensation zone to form a third liquid stream; and
    recycling the third stream back into the polymerization reaction zone without heavies removal treatment.

14. The operating process of claim 13, wherein the liquid comprises an inert diluent, and the solid polyolefin particles comprise polyethylene.

15. The operating process of claim 13, wherein the liquid comprises propylene, and the solid polyolefin particles comprise polypropylene.

16. The operating process of claim 13, comprising:
    passing the solid polyolefin particles to a purging system; and
    extracting entrained liquid from the solid polyolefin particles in the purging system.

17. The operating process of claim 13, comprising: measuring a level of a collected liquid in the liquid collection zone; and
    controlling the condensing of the first portion of the first vapor stream based on the level of the collected liquid in the collection zone.

18. The operating process of claim 13, comprising passing the second liquid stream from the collection zone to a heavies fractionation column.

19. The operating process of claim 13, comprising:
    measuring a temperature of a vapor in the collection zone; and
    adjusting an amount of the first portion of the first vapor stream passed to the condensation zone based on the temperature.

20. The operating process of claim 13, wherein the second liquid stream comprises at least about 1% of the heavies that were contained in the first vapor stream separated from the solid polyolefin particles.

21. The operating process of claim 13, wherein the second liquid stream comprises at least about 5% of the heavies that were contained in the first vapor stream separated from the solid polyolefin particles.

22. The operating process of claim 13, wherein the second liquid stream comprises at least about 10% of oligomers that were contained in the first vapor stream separated from the solid polyolefin particles.

23. The operating process of claim 13, wherein the second liquid stream comprises at least about 20% of oligomers that were contained in the first vapor stream separated from the solid polyolefin particles.

24. The operating process of claim 13, wherein the second liquid stream removed from the collection zone contains at least about 10% of the heavies that were contained in the first vapor stream separated from the solid polyolefin particles.

25. The operating process of claim 13, wherein the second liquid stream removed from the collection zone contains at least about 20% of the heavies that were contained in the first vapor stream separated from the solid polyolefin particles.

26. The operating process of claim 13, wherein substantially all of the heavies removed from the collection zone are removed in the second liquid stream.

27. The operating process of claim 13, wherein the second liquid stream is held in the collection zone for a time sufficient to allow heavies from a vapor in the collection zone to transfer to the second liquid stream in the collection zone.

\* \* \* \* \*